Oct. 6, 1953     O. HEDLUND     2,654,277
MACHINE FOR MAKING AND FORMING TURBINE BLADES
Filed Feb. 26, 1949     6 Sheets-Sheet 2

INVENTOR.
OSCAR HEDLUND
BY
ATTORNEYS

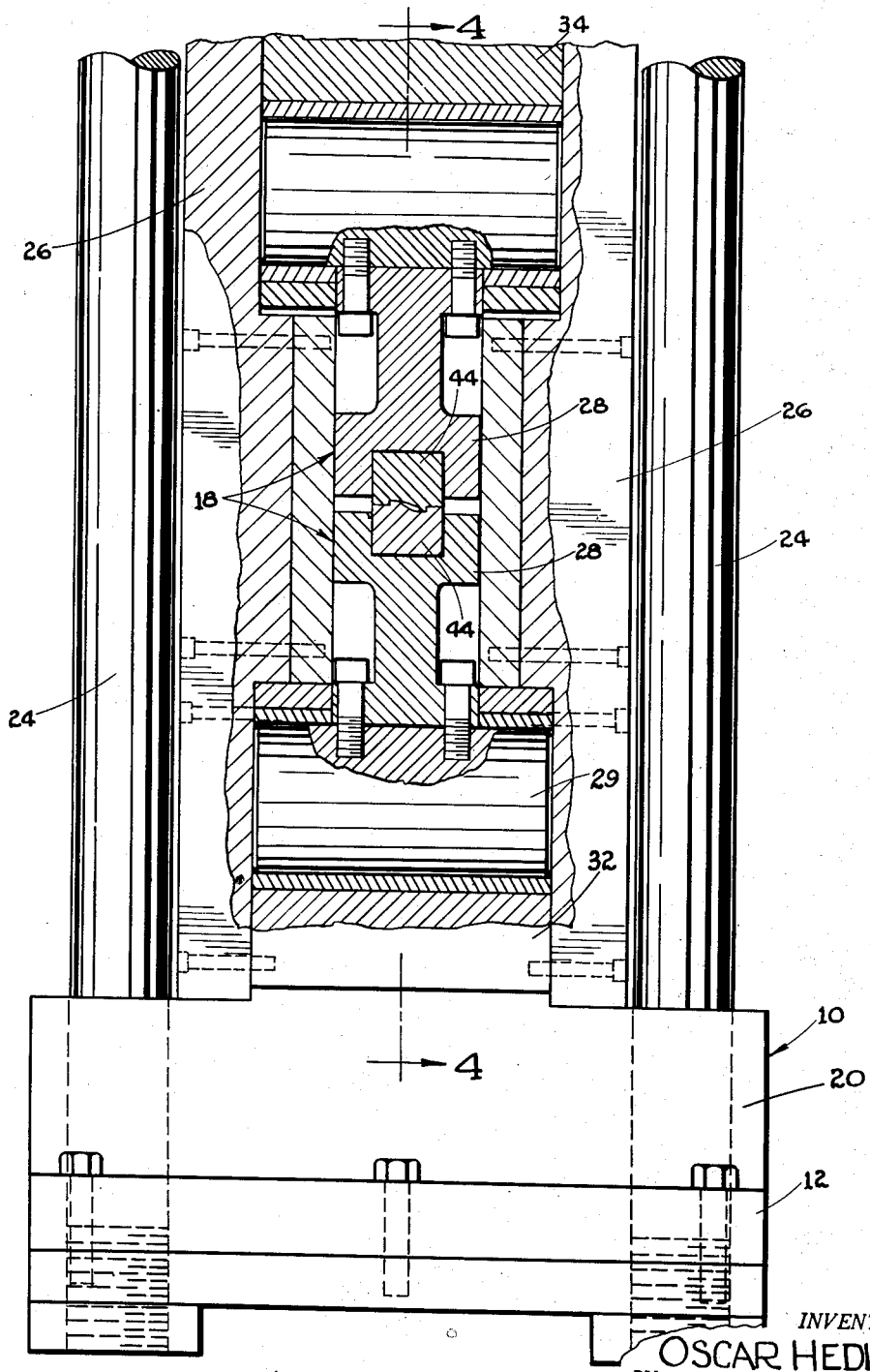

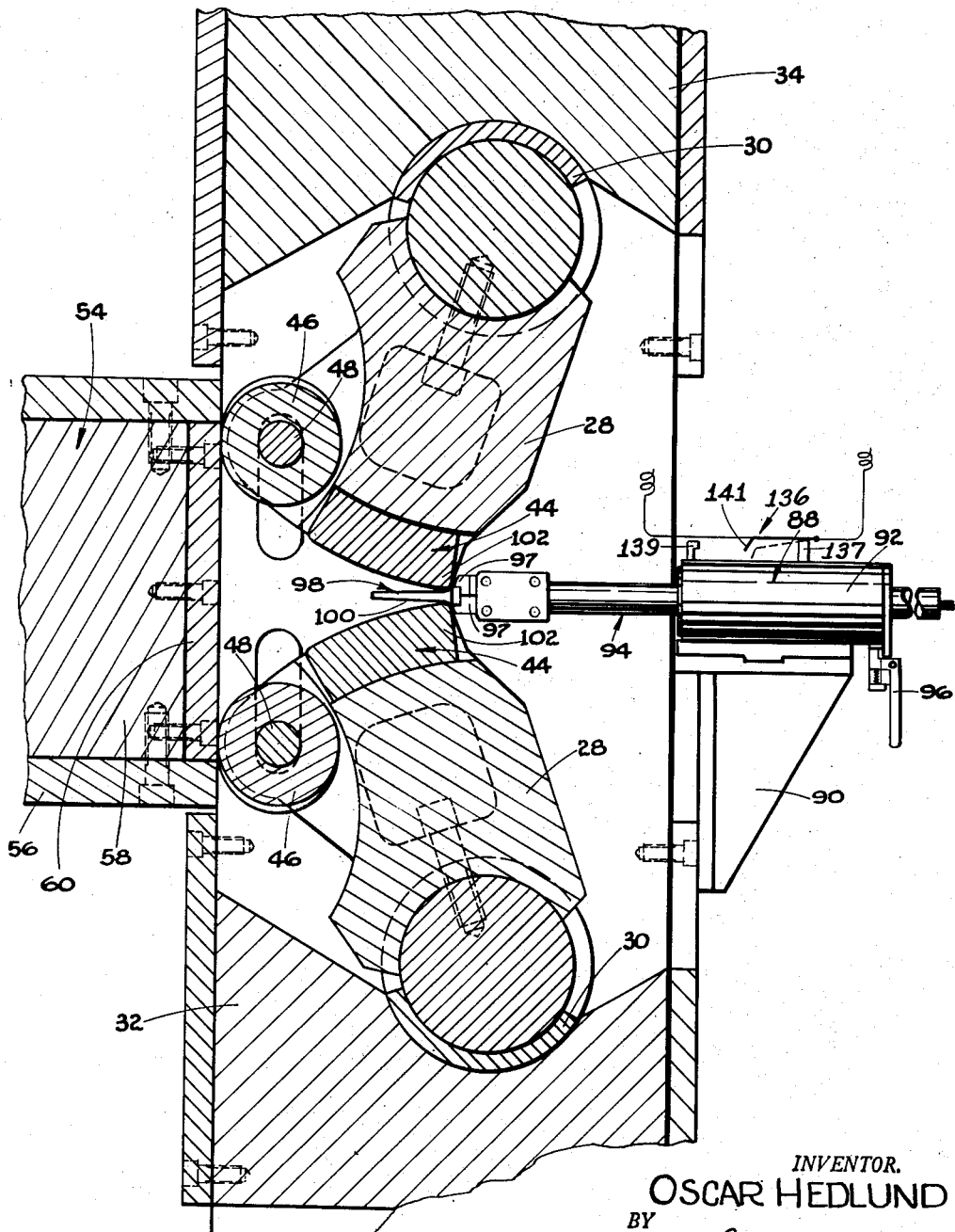

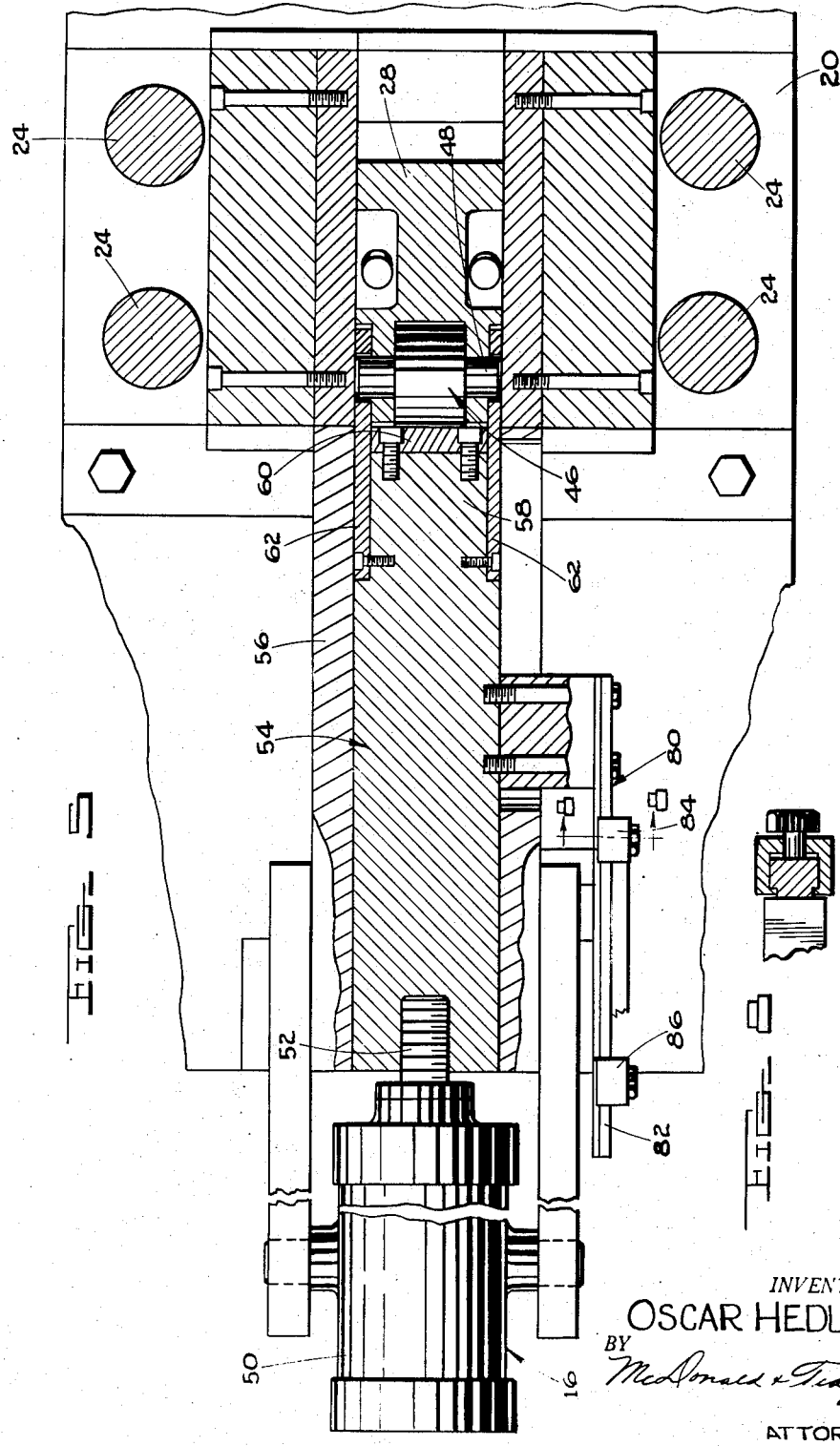

Oct. 6, 1953  O. HEDLUND  2,654,277
MACHINE FOR MAKING AND FORMING TURBINE BLADES
Filed Feb. 26, 1949  6 Sheets-Sheet 6

INVENTOR.
OSCAR HEDLUND
BY
McDonald & Shapiro
ATTORNEYS

Patented Oct. 6, 1953

2,654,277

UNITED STATES PATENT OFFICE 2,654,277

MACHINE FOR MAKING AND FORMING TURBINE BLADES

Oscar Hedlund, Battle Creek, Mich., assignor to Eaton Manufacturing Company, Cleveland, Ohio, a corporation of Ohio Application February 26, 1949, Serial No. 78,556

7 Claims. (Cl. 80—25)

This invention comprehends the provision of a novel method and apparatus for manufacturing metallic blades, such as turbine blades and the like, wherein the blades are initially extruded to rough airfoil section and subsequently rolled to final desired airfoil section, taper and pitch.

An object of the invention is the provision of a method for fabricating tapered pitched blades with precision and economy.

Another object of the invention is the provision of a method for manufacturing blades such as turbine and compressor blades anad the like, comprising the steps of initial extrusion to rough form and subsequent hot and cold rolling operations to final size and configuration whereby a metallic billet is transformed to an airfoil of desired taper and pitch.

A further object of the invention is the provision of a machine including a pair of coacting segmental rollers having die members on the circumferential surfaces thereof adapted to shape the rough blade blank to desired final shape and pitch as predetermined by the shape of the cooperating dies, said rollers being mounted and supported to utilize the predetermined resilient deflection of the roller supporting mechanism for automatically gauging progress of the work, and for automatically adjusting the spacing of the dies as the work progresses, to insure proper spacing for each pass of the work through the dies and elimination of destructive interference between the dies.

Other objects and advantages of the invention will appear from the following description taken in connection with the drawings, forming a part of the specification; and in which:

Fig. 3 is an enlarged fragmentary front elevation of the blade rolling machine, having portions broken away to better illustrate the construction;

Fig. 4 is a vertical cross-sectional view taken along the line 4—4 of Fig. 3 with a blade or work holder shown in full lines;

Fig. 5 is an enlarged cross-sectional view taken along lines 5—5 of Fig. 1, the hydraulic actuating cylinder and associated parts being shown in full lines but broken to save space;

Fig. 7 is an enlarged view, partly in cross-section, taken along lines 7—7 of Fig. 1;

Fig. 8 is an enlarged view partly in cross-section taken along lines 8—8 of Fig. 5;

Figure 1:
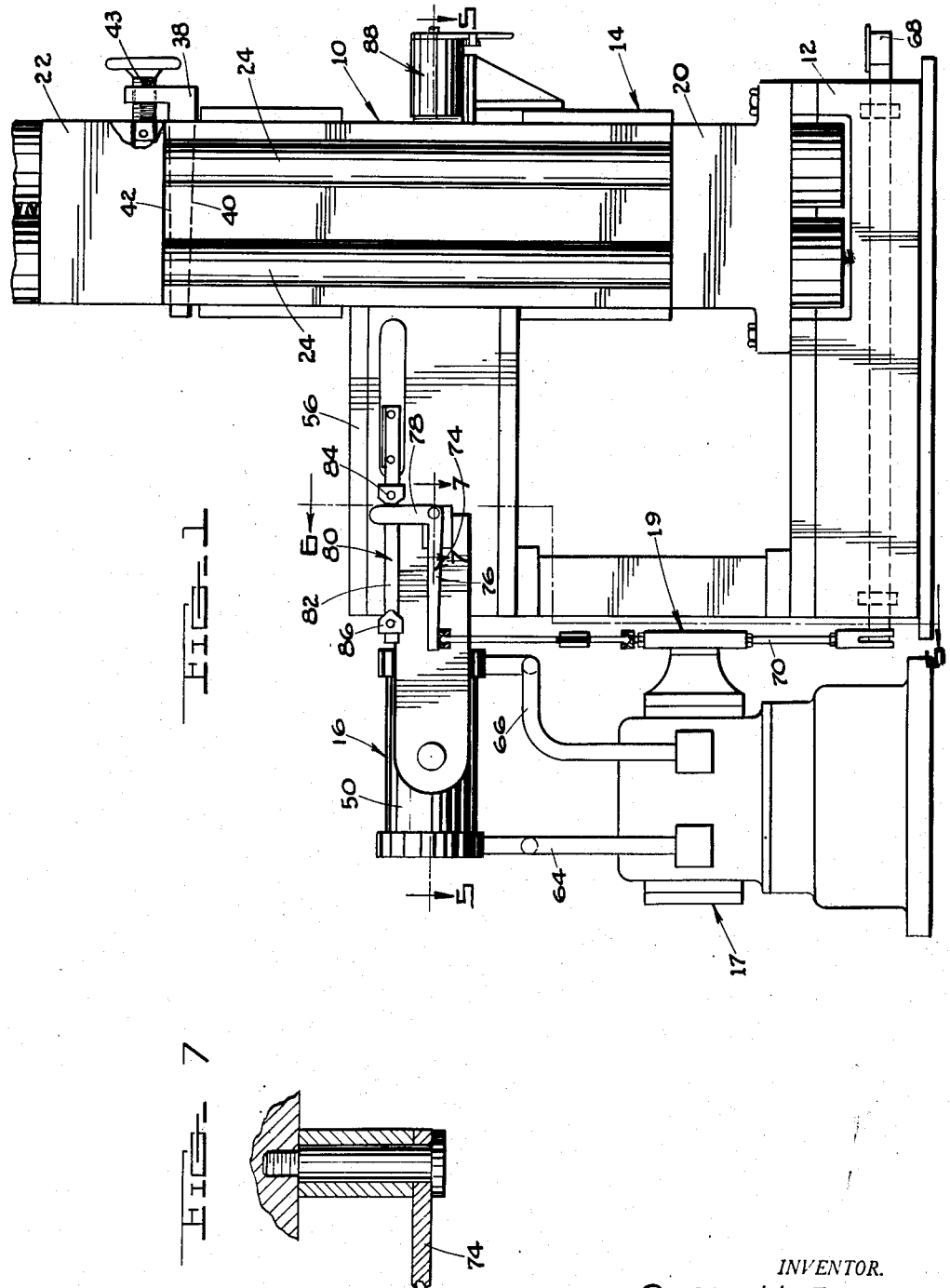
Fig. 1 is a side elevation of the blade rolling machine.
Figures 2, 6:
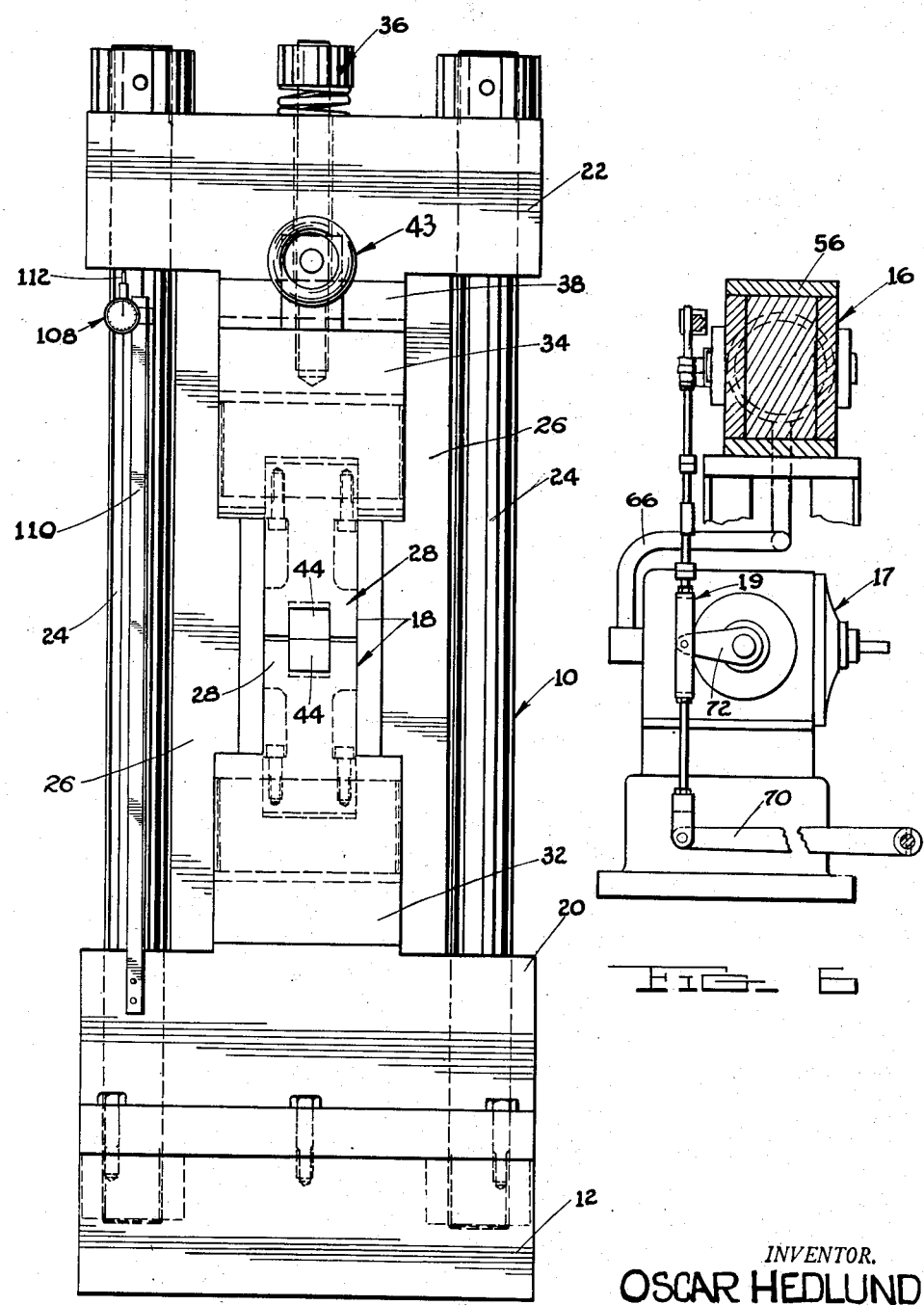
Fig. 2 is a front elevation of the same.
Fig. 6 is a view, partly in cross-section, taken along lines 6—6 of Fig. 1.

This invention provides a novel method of manufacturing metal blades of tough and strong alloys to predetermined cross-section, shape, and pitch anad precise dimension, and to a machine of novel design and construction for effectively and eonomically rolling the blades to final form and size.

Such blades are used in high speed turbines and compressors in jet propulsion engines for aircraft and must be accurately formed of tough heat resistant metal.

The method comprises the major steps of (1) hot extruding a blade blank having a hub portion and an airfoil blade portion so that the flow lines of the grain structure beginning in the hub and extending through the blade are generally parallel to the longitudinal axis of the blade; (2) heating the extruded blank to a predetermined temperature; (3) hot rolling the blank to reduce its cross-sectional size and simultaneously twisting it from root to top to provide a blade having the desired pitch; (4) cold rolling the blade to final size, shape and pitch; and (5) machining the hub and cleaning the blade to adapt it for use.

For carrying out the rolling steps of the method hereinabove defined, I have invented and designed a novel rolling machine provided with a pair of segmental oscillating rollers mounting suitable dies which cooperate to roll the blade to desired final size and form. To form the blade a rough blank is passed repeatedly between the rollers and the latter maintain forming pressure against the blank throughout the rolling periods.

Each pass performs work on the blank which brings it closer to the final desired size and form, and after a sufficient number of passes have been made a finished blade is produced. Inherent elasticity in the frame which supports the rollers, permits the latter to separate or move apart slightly during the rolling operation to prevent excessive destructive stresses in the working parts and to prevent undue wear of the die faces. This feature prolongs the life of the dies and automatically returns the dies to an initial working position after each pass.

By constructing the rolling machine so that most of the elasticity is in certain members of the supporting frame, elongation of these members during rolling operations can be utilized to tell the relative condition of the work and to determine exactly when the work has been reduced to final size and form. The rolling machine here shown is uniquely constructed to take advantage of this phenomenon and is an important feature of the invention.

When forming relatively thin articles such as the turbine blades, here under consideration, some interference may occur between the dies as the rollers are retracted. Such interference greatly increases wear of the die faces and consequently shortens the effective life of the dies. Accordingly, the rolling machine of this invention includes means for moving the rollers apart during retraction thereof so as to prevent any possibility of interference between the dies. It is contemplated that the rollers may be moved apart either manually or automatically at the end of each pass.

In the drawing the numeral 10 designates a blade rolling machine having a frame 14 mounted on a suitable base 12 and carrying a roller mechanism 18. The latter is actuated by a hydraulic ram mechanism 16, and hydraulic liquid is supplied to the ram mechanism by a pump assembly 17. Flow of liquid in the system and operation of the parts are controlled partly manually and partly automatically by a mechanism 19.

The frame 14 comprises lower and upper crossheads 20 and 22 connected together by vertical columns 24. The lower crosshead 20 is bolted to the base 12. Vertical mounting plates 26 disposed between crossheads 20 and 22 at opposite sides of the frame and between columns 24 carry the roller mechanism 18.

Roller mechanism 18 comprises a pair of vertically spaced segmental rollers 28, and the rollers carry dies 44 which cooperate in a manner hereinafter described in detail to form the finished blade. Each roller 28 is bolted to a transverse shaft 29, and the shafts are journaled in bushings 30 carried by lower and upper blocks 32 and 34. The lower block 32 rests upon the lower crosshead 20 and is bolted solidly to the side plates 26. The upper block 34 on the other hand is fastened to the upper crosshead 22 by a spring-loaded bolt 36 and is vertically adjustable against the action of the spring to move rollers 28 relative to each other. Vertical adjustment of the block 34 is accomplished by advancing or retracting a wedge plate 38 interposed between the block and crosshead 22 so as to effect relative movement between the inclined angular surfaces 40 and 42 (Fig. 1). The wedge plate can be conveniently advanced or retracted by an adjusting screw 43 which threadedly engages an upward extension of the plate and is fastened to the crosshead 22 by a suitable swivel connection. Rollers 46 are provided for transmitting thrust from the hydraulic ram mechanism 16 to the rollers 28. The rollers 46 have horizontal shafts 48 and the latter are journaled between lateral extensions formed integrally on the rollers 28.

The hydraulic ram mechanism 16 comprises a fluid cylinder 50. A piston (not shown) is mounted for reciprocation in the cylinder 50 and a piston rod 52 extending from the piston through one end of the cylinder is connected to a ram 54 which is mounted for horizontal sliding movement in guide-ways 56.

Secured to the head 58 of ram 54 is a pressure plate 60 which bears against the rollers 46 and transmits thrust from the ram mechanism 16 to the roller mechanism 18. Plates 62 are fastened to and extend forwardly of the ram 54, and the extending portions thereof have elongated slots which receive the end portions of roller shafts 48 for returning the rollers 28 to the initial position shown in Fig. 4 when ram 54 is retracted.

The pump assembly 17 is conventional and is arranged to supply fluid under pressure to opposite ends of the cylinder 50 through fluid conduits 64 and 66. Flow of liquid through conduits 64 and 66 is controlled by appropriate valves, not shown, which direct fluid to cylinder 50 so as to advance or retract the ram 54.

The cycle of operation is begun by actuation of a foot pedal 68 which acts through linkage 70 and pivoted arm 72 to direct flow of fluid through conduit 64 and behind the piston in cylinder 50 to advance ram rod 52 and move rollers 28 on a rolling pass.

Thereafter, the cycle of operation is controlled automatically by mechanism 19. In this connection it will be observed that a bell crank 74 is pivotally mounted on one of the guide-ways 56. One arm 76 of bell crank 74 is fastened to linkage 70 so that the lever is rocked in a counterclockwise direction when foot pedal 68 is actuated. The other arm 78 of bell crank 74 is actuated by a limit control mechanism 80 which automatically controls operation of ram 54. Specifically, the arm 78 is positioned between and in the path of stops 84 and 86 which are adjustably mounted on a bar 82 carried by ram 54. Stop member 86 contacts arm 78 when the ram 54 approaches its fully advanced position to rock the bell crank 74 in a clockwise direction, as viewed in Fig. 1, and the bell crank operates the fluid control mechanism 19 to reverse the flow of hydraulic liquid to cylinder 50. Thereupon the ram 54 retracts until the piston reaches the rearward end of cylinder 50. At the end of the return movement, stop 84 engages arm 78 bell crank 74 and returns the fluid control mechanism 19 to its initial neutral position and shuts off flow of liquid to the cylinder 50. This completes the cycle of operation, and the machine shuts down until the foot pedal 68 is again actuated to start another operating cycle.

The blade holding mechanism 88 comprising a mounting bracket 90 is bolted to the lower block 32 and a housing 92 is mounted on the bracket. A suitable, manually operable blade clamping jaw mechanism 94 is supported for axial and rotative movement in the housing, and means 96 is provided for locking the mechanism 94 against rotative movement.

The blade clamping jaw mechanism 94 includes a pair of jaws 97 which clampingly engage the hub 104 of a rough extruded blank 98 and position the blade portion 100 of the blank properly with respect to the dies 44. Before the pedal 68 is actuated to begin the machine cycle, the blade portion 100 of work blank 98 is advanced between dies 44 until the hub portion thereof is disposed in abutting relation with the nose portions 102 of the dies. As the rollers 28 rock forwardly during the first part of the machine cycle, dies 44 roll along the blade 100. Thus a longitudinal rolling movement under pressure takes place which forms and simultaneously twists the blade according to the shape of the die surfaces. Also, the blade formed in this manner obviously will have the desirable characteristic that the grain of the metal will run in the direction of the length of the blade. In this connection, it will be noted that longitudinal rolling of the blank reproduces the same grain pattern established by the initial extrusion operation. These combined factors assure a blade of high tensile strength since the flow lines lie transverse to the direction of thrust applied to the blades in use. At the end of the rolling pass the work is ejected from between the dies 44 and the latter are returned empty to their initial starting position.

The extruded blank 98 is considerably thinner than the finished blade, and the rollers 28 must separate slightly during the rolling pass to accommodate the blank between dies 44. According to the present invention, separation of the rollers is accomplished by stretching or elongation of parts connecting the rollers and particularly of the columns 24. The columns 24 are never stretched beyond their elastic limits and since they always return to their original position and shape after each pass, it is possible to use the amount of elongation in the columns as a function for determining the progress of the blank and for ascertaining exactly when the blank has been reduced to final size and form. Also, this phenomenon permits the blanks or partly formed blades to be passed repeatedly between the dies 44 without imposing excessive pressure on the dies. As a result the life of the dies is prolonged, and at the same time automatic adjustment of the dies toward one another is achieved.

The blanks 98 are formed by a hot extrusion process wherein the blade portion 105 of each blank is formed from the hub to the tip thereof so that the grain of the metal extends in the direction of the longitudinal axis of the blade. After the rough extrusion, the blank is cleaned and then heated to a temperature that will permit proper hot rolling between the dies 44. Immediately after heating, the hub portion 104 of the blank is clamped in the jaws 97 and pushed forwardly between the segmental rollers 28 until the root of the blade abuts the noses 102 of dies 44. Foot pedal 68 is then actuated to direct fluid under pressure behind the piston in the cylinder 50 to advance the ram 54. As the ram advances, pressure plate 60 acts against rollers 46 to rock the segmental rollers 28 and dies 44 to the right, as viewed in Fig. 4. Pressure is exerted continuously against the work and as the rollers 28 swing to the right, dies 44 travel progressively along the length of the blade 100. As the blank 98 is passed between dies 44, excess metal is pressed from between the die faces and the amount of metal displaced depends in each instance upon the particular pressure imposed on the dies. Any necessary or desirable number of hot passes may be made and the blank 98 preferably is treated to remove scale after each pass. After hot rolling the semi-finished blank 98 is annealed and cold rolled until it is reduced to final size and form. Upon completion of the cold rolling operation the blade is hardened and drawn to relieve internal stresses.

As a means of positively determining when the blade attains its final size and form, an indicator gage 108 is mounted on a vertical support 110 secured to the lower crosshead 20 with the feeler 112 of the indicator in engagement with the upper crosshead 22. The gage 108 is initially adjusted to neutral or zero position with a finished pilot blade disposed between the dies 44. Thereafter, the amount of elongation produced in the columns 24 by any rolling pass will be indicated directly on the gage 108. In this manner, the progress of the work as it is transformed by successive rolling operations from a rough blank to a finished blade can be readily observed. Manifestly an oversize extruded blank will cause a greater elongation of columns 24 and consequently a greater deflection of the indicator hand than a finished or semi-finished blade. The blade will have achieved its final size and form when the gage 108 registers little if any change as the blade is rolled between the dies 44. It is desirable to adjust the wedge plate 38 so as to bring the dies 44 slightly closer together after completing the hot rolling operations and before beginning cold rolling operations on any particular workpiece. By allowing a predetermined spacing of the dies during the hot rolling operations wherein a greater amount of excess metal is displaced per rolling operation as compared to a cold rolling operation the dies are relieved of any excess pressures that might otherwise be exerted thereagainst. This adjustment of the dies can also be made if necessary after each hot rolling operation whether one or more such operation is performed in carrying out the hereinbefore recited rolling steps. The adjusted position of wedge plate 38 determines the initial spaced relation of dies 44 but has little effect on the spacing of the dies during a rolling operation.

Figure 12:
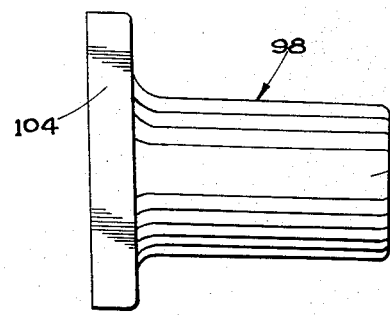
Fig. 12 is a plan view of the extruded rough blade blank prior to any rolling operations by the machine.
Figure 9:
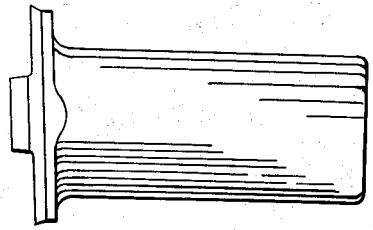
Fig. 9 is a plan view of a finished blade made by the machine.
Figure 14:
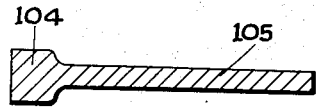
Fig. 14 is a longitudinal and central cross-section view of the blade blank shown in Fig. 12.
Figure 11:
Fig. 11 is a longitudinal central cross-section view of the blade shown in Fig. 9.
Figure 13:
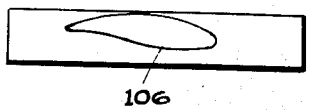
Fig. 13 is an end view of the blade blank of Fig. 12 looking from the tip end toward the hub end of the blank.
Figure 10:
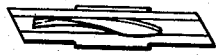
Fig. 10 is an end view of the blade of Fig. 9 looking toward the hub end from the tip end of the blade.

The extruded blank 98 shown in Figs. 12–14 has a hub 104 and an airfoil blade 105. Both portions of the blade are somewhat oversize and each has generally the same shape as the corresponding portion in the finished blade. A finished blade is shown in Figs. 9–11. It will be observed that both portions 104 and 105 have been reduced in size and modified in form and that the blade 105 has been given a decided twist characteristic of turbine blades.

Figure 15:
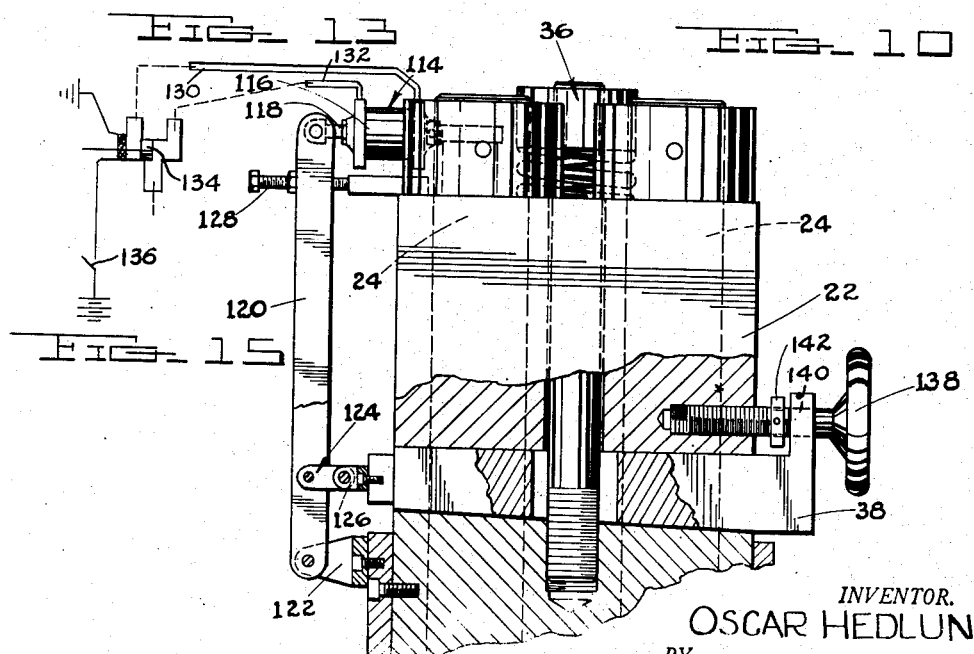
Fig. 15 is an enlarged fragmentary view and side elevation of the upper end of the machine shown in Fig. 1, having parts broken away to show the mechanism for adjusting the die spacing, and diagrammatically showing the control therefor.

Fig. 15 illustrates means for automatically retracting the wedge plate 38 at the end of each rolling pass so as to separate the rollers 28 and prevent interference between dies 44 when the rollers are returned to their initial position. In the form of the invention here shown, wedge plate 38 is actuated pneumatically by a mechanism 114 which comprises a fluid cylinder 116 pivotally mounted at one end to the upper cross head 22. A double acting piston (not shown) is mounted for reciprocation in the cylinder 116, and the piston rod 118 is connected to one end of a lever 120 which is pivoted at the other end thereof to block 34 by a bracket 122. A link 124 is pivoted to lever 120 intermediate the ends of the latter, and link 124 is attached to wedge plate 38 by a clevis connection 126.

Movement of piston rod 118 to the left, as viewed in Fig. 15, advances wedge plate 38 to move rollers 28 and the dies 44 carried thereby closer together, and advancement of the wedge plate can be selectively controlled by engagement of the plate extension 140 with an adjustable collar 142 on hand screw 138. Reversely, movement of piston rod 118 to the right retracts wedge plate 38 to separate rollers 28, and retraction of the wedge plate can be selectively controlled by an adjustment screw mechanism 128 carried by lever 120.

Conduits 130 and 132 communicate with the opposite ends of the cylinder 114. Flow of air through the conduits 130 and 132 is controlled by a solenoid actuated valve 134 and flow of current to the solenoid is controlled by a switch 136. The switch 136 can be conveniently actuated by a part 137 of the blade holding mechanism 88 to close it for one axial direction of movement of mechanism 88 and by a part 139 of mechanism 88 in an opposite axial direction of movement of mechanism 88 engageable with an element 141 of the switch 136 to open it so that the segmental rollers 28 are adjusted automatically when a blank is inserted between the dies 44. In the arrangement here shown, switch 136 is adapted to be closed when work is inserted in the machine, and closure of the switch positions valve 134 to direct air under pressure ahead of the piston in cylinder 116. When this occurs, wedge plate 38 is advanced against the action of the spring-bolt mechanism 36 until the extension 140 engages stop 142 as described. This movement of wedge plate 38 positions dies 44 in proper spaced relation, and this relative position is maintained throughout the rolling operation. When the work is ejected from between dies 44 at the end of the rolling pass, switch 136 is opened by the blade holding mechanism 88 to effect disengagement of the solenoid of valve 134, reverse the flow of air under pressure to cylinder 116, and retract the wedge plate 38 within limits defined by stop 128. As the wedge plate 38 retracts, the spring-loaded bolt 36 raises the upper roller 28 sufficiently so that there is no interference between the dies 44 when the rollers are returned to their original position.

Automatic separation of the segmental rollers 28 is particularly necessary when the work has a thin sharp edge. When this situation exists, there is relatively high loading of the dies over a relatively small area and it is essential to prevent the dies from interfering or clashing when the rollers 28 are retracted. Automatic spacing of the dies 44 by the mechanism 114 very effectively accomplishes the desired results and prolongs die life.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A rolling machine comprising a supporting frame, pivoted segmental rollers carried by said frame, said rollers adapted to carry forming dies and rockable about their pivots to exert forming pressure against a workpiece disposed between the dies, pressure rollers carried by the respective segmental rollers, a reciprocable ram including a face plate positioned perpendicular to the line of movement of the ram arranged for endwise engagement with said pressure rollers and operative to apply driving force to said segmental rollers through said pressure rollers, plate means fixedly secured to the ram and extending axially therefrom having elongated slots therein receiving shaft extensions of the pressure rollers therein, effective upon a retroactive movement of the ram to simultaneously retract the segmental rollers.

2. A rolling machine comprising a pair of roller assemblies mutually cooperative to exert forming pressure against a workpiece disposed therebetween, work holding mechanism movable to insert a workpiece between said rollers and to accommodate movement of the workpiece during a rolling operation, means including a slidable wedge plate for adjusting one of said roller assemblies relative to the other of said roller assemblies, means including a pivoted arm and a connection between the arm and the wedge plate for sliding the latter back and forth between predetermined limits, and power means including a control element engageable by said work holding mechanism for controlling the operation of said power means for actuating said arm to slide the wedge plate in one direction when a workpiece is inserted between the roller assemblies, and to slide the wedge plate in a reverse direction when the workpiece is released by the roller assemblies after a rolling operation.

3. A rolling machine comprising a supporting frame having upper and lower members connected together and normally held in fixed spaced relation by essentially rigid, inherently resilient elements, a pair of roller assemblies carried by said members and mutually cooperative to exert forming pressure against a workpiece disposed therebetween, work holding mechanism movable to insert a workpiece between said rollers and to accommodate movement of the workpiece during a rolling operation, means including a slidable wedge plate for adjusting one of said roller assemblies relative to the other of said roller assemblies, means including a pivoted arm and a connection between the arm and the wedge plate for sliding the latter back and forth between predetermined limits, and means controlled by the operational movement of said work holding mechanism for actuating said arm to slide the wedge plate in one direction when a workpiece is inserted between the roller assemblies, and to slide the wedge plate in a reverse direction when the workpiece is released by the roller assemblies after a rolling operation.

4. A machine for fabricating a blade comprising a pair of pivotal roller dies having cooperating die cavities shaped to give the blade the desired cross-sectional shape and rollers supported at a radius arm substantially equal to the radius arm at which the dies are disposed, a frame comprising a stationary base, a head vertically spaced relative to the base and columns interconnecting the base and head, one of the dies being pivotally supported on the base and the other die being pivotally supported on the head in vertically spaced relation to the first mentioned die, fluid pressure operated means engageable with the rollers supported on the dies for actuating the dies in unison, spring means normally urging the die associated with the head vertically away from the other die, means for adjusting the die associated with the head against the resistance of the spring means, including a wedge disposed between the die supported on the head and a portion of the head, means for actuating the wedge against the resistance of the spring means when work is inserted between the roller dies and retracting the wedge after the work is moved from between the roller dies, said columns being deflectable during a rolling cooperation of the dies with a blade therebetween to automatically adjust the dies relative to one another as a succession of blade rolling passes are made.

5. A machine for manufacturing a blade of predetermined configuration and size comprising a pair of rolling dies having cooperating die cavities shaped to give the blade the desired configuration and size, said dies each having a roller pivoted thereon, a framework for pivotally supporting the rolling dies relative to one another, a fluid pressure forward and reverse motion actuated ram engageable with the rollers to move the rolling dies into engagement with one another, and a plate affixed to the ram loosely interconnecting the ram to the rolling dies.

6. A machine for fabricating a blade to given cross-sectional shape from a rough extruded blade comprising a pair of roller dies having cooperating die cavities shaped to give the blade the desired cross-sectional shape in the longitudinal rolling thereof between the dies, a framework comprising a stationary base member, a head member vertically spaced therefrom and vertically arranged columns interconnecting the base and head members, one of said dies being pivotally supported on the base member spring mounted and relatively movable thereto, each of the dies having roller means near a rear extremity thereof adjacent one end of the die cavities, ram means including a plate arranged perpendicular to the line of thrust of the ram for engaging the roller means and for actuating the dies into engagement with one another, a wedge plate interposed between the head member and die associated therewith for establishing the vertical position of this die relative to the die associated with the base member, a double acting fluid pressure operated mechanism for moving the wedge plate between the head member and die associated therewith and adjustment means for limiting the movement of the wedge plate in both directions, a valve controlled supply of pressure fluid for the members, and an electrical circuit including an electrical solenoid for actuating the valve and an electric switch for controlling the flow of current through the circuit said columns being deflectable within certain limits of pressure imposed on the dies during a rolling operation so as to automatically adjust the dies to one another.

7. A machine for fabricating a blade to given cross-sectional shape from a rough extruded blade comprising a pair of roller dies having cooperating die cavities shaped to give the blade the desired cross-sectional shape in the longitudinal rolling thereof between the dies, a framework comprising a stationary base member, a head member vertically spaced therefrom and columns interconnecting the base and head members, one of said dies being pivotally supported on the base member and the other die being pivotally supported on the head member spring mounted and relatively movable thereto, means for actuating the dies into engagement with one another, a wedge plate interposed between the head member and die associated therewith adjustably movable therebetween in a horizontal direction to effect a vertical motion of the die associated with the head member relative to the other die and head member, a lever pivotally supported on the head member having one end pivotally attached to one end of the wedge plate, a fluid pressure operated device comprising a cylinder pivotally mounted on the head member and a double acting piston reciprocably movable therein having pivotal attachment to the other end of the lever, an adjustment screw for limiting the movement of the wedge plate in one horizontal direction, an adjustment screw for limiting the movement in another horizontal direction, a fluid pressure source for the fluid pressure operated device, valve means for controlling the flow of pressure fluid to the cylinder of the fluid pressure operated device and an electrical circuit including means for operating the valve and a switch, a horizontally movable workholder having parts thereof engageable with the switch for controlling the circuit and operational phase of the valve.

OSCAR HEDLUND.

References Cited in the file of this patent

UNITED STATES PATENTS

| Number | Name | Date |
|---|---|---|
| 239,245 | Hayden | Mar. 22, 1881 |
| 741,085 | Webb | Oct. 13, 1903 |
| 791,288 | Prouty | May 30, 1905 |
| 840,426 | Briede | Jan. 1, 1907 |
| 848,630 | Cameron | Apr. 2, 1907 |
| 1,114,888 | Kohlhass | Oct. 27, 1914 |
| 1,153,550 | Hamilton | Sept. 14, 1915 |
| 2,044,293 | Handler | June 16, 1936 |
| 2,057,924 | Smith | Oct. 20, 1936 |